United States Patent Office 3,639,433
Patented Feb. 1, 1972

3,639,433
22-GUANIDYL STEROIDS AND METHOD OF MAKING AND USING THE SAME
Rainer Philippson, Bergkamen, Heinz Gibian, Berlin, Mahmud Muftic, Genf, and Emanuel Kaspar, Kamen, Germany, assignors to Schering Aktiengesellschaft, Berlin, Germany
No Drawing. Filed June 13, 1968, Ser. No. 742,473
Int. Cl. C07c 169/14
U.S. Cl. 260—397
8 Claims

ABSTRACT OF THE DISCLOSURE

A compound of the formula

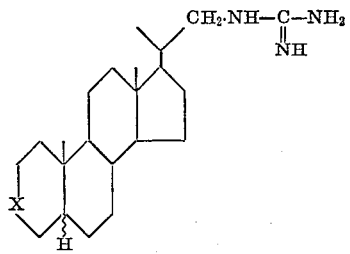

wherein X denotes

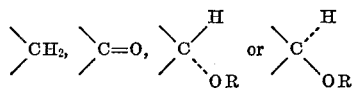

R is hydrogen or acyl, and rings A and B may be in trans or cis position relative to each other, is produced by reacting a compound of the formula

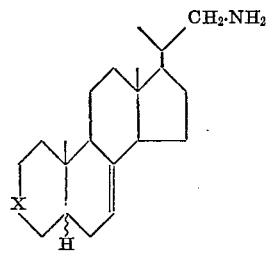

wherein X has the same meaning as in the formula above with a substance selected from the group consisting of cyanamide and salts of S-alkyl- and S-aralkylisothiourea; and esterifying a 3-hydroxl group or saponifying a 3-acyloxy group of the thus obtained reaction product. Such compound is effective in the treatment of certain infectious conditions including fungus infections.

BACKGROUND OF THE INVENTION

The present invention is concerned with new bacteriostatic, fungistatic and trichomonocidal compositions, a method of producing the same and the use thereof in the treatment of infectious conditions.

The conventional medications for such purposes, for instance fusidic acid, commercially available under the tradename Fucidin, generally are specific only with respect to some of these conditions, the mentioned composition, for instance, is ineffective against yeasts, certain skin fungi and trichomonades.

It is an object of the present invention to provide a composition which can be effectively used against a very broad range of infectious conditions.

SUMMARY OF THE INVENTION

According to the present invention, a compound selected from the group consisting of compounds of the formula:

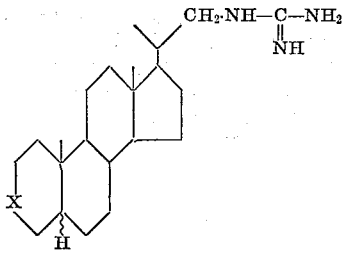

wherein X denotes

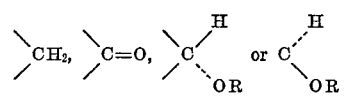

R is hydrogen or acyl, and rings A and B may be in trans or cis position relative to each other, and pharmaceutically acceptable salts thereof, is produced by reacting a compound of the formula:

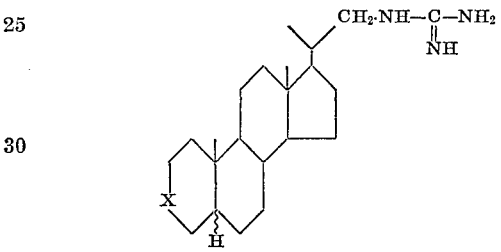

wherein X has the same meaning as above, with a substance selected from the group consisting of cyanamide and salts of S-alkyl- and S-aralkylisothiourea; and esterifying a 3-hydroxyl group or saponifying a 3-acyloxygroup of the thus obtained reaction product.

The present invention also contemplates a pharmaceutical composition for topical or oral administration for the treatment of infectious conditions, said composition comprising an effective amount of the above-described compound and a pharmaceutical diluent.

Furthermore, the present invention is concerned with the treating of a patient suffering from dermatomycosis, sepsis, pneumonia or an infection of the urinary tract, comprising the step of administering to such patient an effective amount of the above-described compound.

Preferably, the compound is selected from the group consisting of 22-guanidyl-5β-bisnorcholane-3α-ol, 22-guanidyl-5β-bisnorcholane, 22-guanidyl-5α-bisnorcholane, 22-guanidyl-5β-bisnorcholane-3-on, and pharmaceutically acceptable salts thereof, particularly the N-acetate and the hydrochloride.

DESCRIPTION OF THE PREFERRED EMBODIMENTS

The present invention is concerned with 22-guanidyl steroids of the general formula

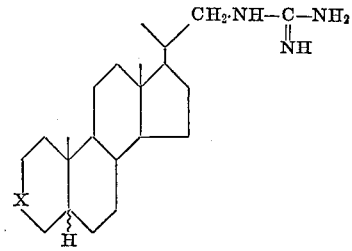

wherein X denotes

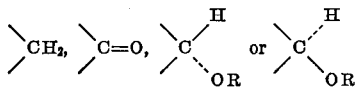

wherein R is hydrogen or acyl, and rings A and B may be located in trans or cis position relative to each other, as well as salts thereof, particularly pharmaceutically acceptable salts such as the N-acetates and the hydrochlorides.

The 22-guanidyl steroids described above are effective bacteriostatic, fungistatic and trichomonocidal agents.

They are particularly effective against pathogenic yeasts and skin fungi such as *Candida albicans, Microsporum gypseum, Trichophyton mentagrophytes, Epidermatophyton floccosum* and *Aspergillus fumigatus*, as well as against trichomonades, for instance, *Trichomonas vaginalis* and *Trichomonas feotus*.

Furthermore, they are effective, for instance, against staphylococci.

Thus, for instance, the growth if *Candida albicans* is completely inhibited in the conventional tube dilution test by utilizing 2γ/ml. of 22-guanidyl-5β-bisnorcholane-3α-ol-N-acetate, whereas the same effect is achieved with Nystatin which is conventionally used as a standard for this purpose, only with 10γ/ml. Furthermore, the compounds of the present invention may be advantageously used for combatting such microorganisms which already have become resistant to other agents. For instance, the growth of penicillin-resistant *Staphylococcus pyogenes aureus* 127 C can be completely inhibited with less than 1γ/ml. 22-guanidyl-5β-bisnorcholane-N-acetate in the conventional tube dilution test, whereas more than 10γ/ml. of the conventional d(—)-threo-1-p-nitrophenyl-2-dichloroacetyl-aminopropane-1,3-diol are required to achieve the same purpose.

Thus, the spectrum of effectiveness of the compounds or compositions of the present invention is characterized by its very desirable greater chemotherapeutic breadth.

Compositions which are conventionally used for corresponding purposes, for instance Fucidin, are ineffective against some infections, for instance against yeasts, skin fungi and trichomonoates.

The 22-guanidyl steroids of the present invention are obtained by reacting compounds of the general formula

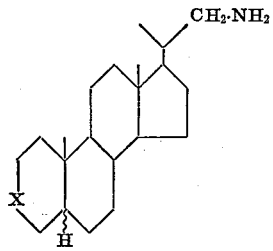

wherein X denotes

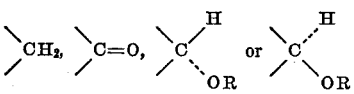

in per se known manner with cyanamide or with a salt of S-alkyl- or S-aralkyl-isothiourea, followed, if desired, by esterification of a 3-hydroxy group or saponification of a 3-acyloxy group, and/or freeing from the initially obtained 22-guanidyl salt the free base in per se conventional manner, which free base, if desired, may then be converted with another acid into the salt thereof.

The salt formation may be carried out with pharmaceutically acceptatble inorganic or organic acids, for instance hydrochloric acid, sulfuric acid, phosphoric acid, formic acid, acetic acid, butyric acid, caproic acid, oxalic acid, succinic acid, benzoic acid, gluconic acid, heptagluconic acid, galacturonic acid, pelargonic acid, lactic acid, citric acid and the like.

If the 22-guanidyl residue is introduced by means of S-alkyl- or S-aralkyl-isothiourea, alkyl or aralkyl mercaptan will be freed in the course of the reaction. Since, preferably the reaction is carried out at elevated temperature, most preferably at the boiling temperature of the solvent in which the reaction is carried out, S-alkyl isothioureas such as S-methylisothiourea are particularly suitable reactants because the easily volatilizable S-alkyl mercaptan which is formed during the reaction will be volatilized and thus distilled out of the reaction mixture already during the course of the reaction.

The compounds obtained according to the present invention serve for topical, parenteral or oral treatment of, for instance, dermatomycoses, septic conditions, pneumonias, infections of the urinary tract, and the like.

The compounds of the present invention are particularly well suited for the treatment of mixed infections, due to their broad spectrum activity. For this purpose, the compounds are worked up in conventional manner with conventional pharmaceutical diluents or carriers and converted into the conventional form of such medications, for instance into tablets, dragees, ointments, solutions, sprays and the like.

The following examples are given as illustrative only without, however, limiting the invention to the specific details of the examples.

Example I 840 mg. 22-amino-5β-bisnorcholane-3α-ol are dissolved in 4.5 ml. hot ethanol and, under boiling, a solution of 360 mg. S-methylisothiourea-acetate in 2 ml. water is dropwise added thereto.

The thus obtained reaction mixture is then heated under reflux until no more methylmercaptan escapes.

Thereafter, the reaction mixture is concentrated under reduced pressure and with the addition of benzene until a dry residue is obtained and the thus obtained crude product is twice stirred with hot acetic acid ester. It is then sucked off while hot and recrystallized from glacial acetic acid-acetone. In this manner, 750 mg. of 22-guanidyl-5β-bisnorcholane-3α-ol-N-acetate are obtained having a melting point (under decomposition) of 235–236° C.

Example II 560 mg. 22-amino-5β-bisnorcholane is dissolved in 3 ml. hot ethanol and under boiling, a solution of 240 mg. S-methylisothiourea-acetate in 1.5 ml. water is dropwise added. The reaction mixture is heated for about 6 hours under reflux and thereafter concentrated to dryness with the addition of benzene.

The thus obtained crude product is boiled with 50 ml. acetic acid ester and filtered while hot. After recrystallization from glacial acetic acid-acetone, 210 mg. of 22-guanidyl-5β-bisnorcholane acetate having a melting point of 222–224° C. is obtained.

Example III 1 g. 22-amino-5β-bisnorcholane hydrochloride is heated with 1 g. cyanamide in 25 ml. absolute ethanol for 16 hours at 130° C. The heating is carried out in a Carius tube. After cooling and opening of the Carius tube, the reaction solution is separated by filtration from insoluble constituents and the filtrate is concentrated to one-fifth of its original volume. During concentrating dicyandiamide precipitates and is separated by filtration. The thus obtained filtrate is diluted with about 250 ml. acetone and allowed to stand in cold condition for about 16 hours. The thereby precipitated 22-guanidy-5β-bisnorcholane hydrochloride is sucked off. A yield of 450 mg. is obtained and the compound has a melting point of between 304° and 306° C. (under decomposition).

Example IV 280 mg. 22-guanidyl-5β-bisnorcholane-acetate is dissolved in 10 ml. warm ethanol and 1 ml. of 6-normal hydrochloric acid is dropwise added thereto. After cooling, the precipitated crystals are sucked off, washed and dried. In this manner, 220 mg. of 22-guanidyl-5β-bisnorcholane hydrochloride is obtained having a melting point of 304°–306° C. (under decomposition).

Example V

Similarly as in Example IV, it is possible to obtain from 250 mg. 22-guanidyl-5β-bisnorcholane-3α-ol-acetate 200 mg. 22-guanidyl-5β-bisnorcholane-3α-ol-hydrochloride having a melting point of 295–298° C. (under decomposition).

Example VI 1.38 g. 22-amino-5α-bisnorcholane and 0.69 g. S-methyl-isothiourea-acetate are reacted and worked up as described in Example I. After recrystallization from acetone-glacial acetic acid, 0.55 g. of 22-guanidyl-5α-bisnorcholane-N-acetate having a melting point of 245°–248° C. (under decomposition) is obtained.

Example VII 0.8 g. 22-amino-5β-bisnorcholane-3-on and 0.4 g. S-methylisothiourea-acetate are reacted, worked up and recrystallized as described in Example I. In this manner, 0.25 g. 22-guanidyl-5β-bisnorcholane-3-on-N-acetate is obtained.

Preferably, the compounds of the present invention are administered per os in a daily dosage of between about 1 and 2 grams. However, topical administration is also frequently desirable, in which case the compounds of the present invention may be incorporated as the effective agents into ointments so that the compounds of the present invention represent preferably between about 0.1 and 5% of the weight of the ointment.

Conditions which are amendable to treatment with the compounds of the present invention by administration in the manner and dosages described above include skin candidiasis, onychomycosis, paronychia, wet eczema of the scalp, intertrigo, vulvovaginitis, intestinal moniliasis, pyodermia and pyosinusitis.

It has been found that 22-guanidyl-5β-bisnorcholane-3α-ol and salts thereof are particularly effective against staphylococcus and *Candida albicans*, that 22-guanidyl-5β-bisnorcholane and its salts give good results in the treatment of infections caused by staphylococcus, trichomonades and certain dermatophytes, that 22-guanidyl-5α-bisnorcholane is particularly effective against dermatophytes and *Candida albicans*.

The following examples will serve to illustrate preferred embodiments of the pharmaceutical composition of the present invention, without limiting the invention to the specific details of these examples.

Example VIII

| | Mg. |
|---|---|
| Compound of the present invention, e.g. 22-guanidyl-5β-bisnorcholane-3α-ol-N-acetate | 500 |
| Corn starch | 82 |
| Polyvinylpyrrolidone | 3 |
| Talcum | 13 |
| Magnesium stearate | 2 |
| | 600 | are pressed into a tablet formed with groove to permit easy breaking into two substantially equal halves.

Example IX 1 g. finely comminuted effective compound, for instance 22-guanidyl-5β-bisnorcholane-3α-ol-N-acetate, is homogeneously distributed in a single phase ointment base of the following composition:

| | G. |
|---|---|
| Highly viscous paraffin oil | 61 |
| Hard paraffin | 20 |
| Soft petroleum jelly | 18 |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A compound selected from the group consisting of (A) compounds of the formula

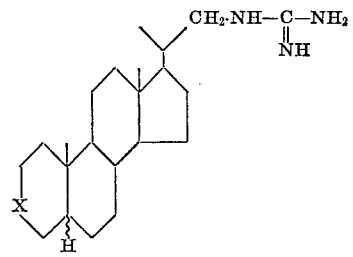

wherein X denotes

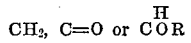

R is hydrogen or acyl derived from an aliphatic monocarboxylic, dicarboxylic or hydroxy acid or an aromatic mononuclear acid, the said acids having from 1 to 9 carbon atoms, R is hydrogen or acyl, and rings A and B may be in trans or cis position relative to each other, and (B) pharmaceutically acceptable salts thereof.

2. A compound selected from the group consisting of 22-guanidyl-5β-bisnorcholane-3α-ol and the N-acetate and hydrochloride thereof.

3. A compound selected from the group consisting of 22-guanidyl-5β-bisnorcholane and the N-acetate and hydrochloride thereof.

4. A compound selected from the group consisting of 22-guanidyl-5α-bisnorcholane and the N-acetate thereof.

5. A compound selected from the group consisting of 22-guanidyl-5β-bisnorcholane-3-on and the N-acetate thereof.

6. A method for producing 22-guanidyl steroids of the formula of claim 1, comprising the steps of reacting a compound of the formula

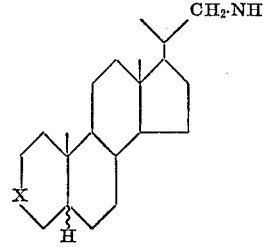

wherein X has the same meaning as in the formula of claim 1, with a substance selected from the group consisting of cyanamide and salts of S–alkylisothiourea.

7. A method as defined in claim 6 and including the step of converting the thus obtained 22-guanidyl salt into the free base thereof.

8. A method as defined in claim 7, and including the further step of reacting the thus obtained free base with an acid so as to obtain the 22-guanidyl salt of said acid.

References Cited

UNITED STATES PATENTS 3,325,517   6/1967   Meyer et al.

HENRY A. FRENCH, Primary Examiner

U.S. Cl. X.R.

260—397.3, 397.5; 424—238